Patented Dec. 1, 1936

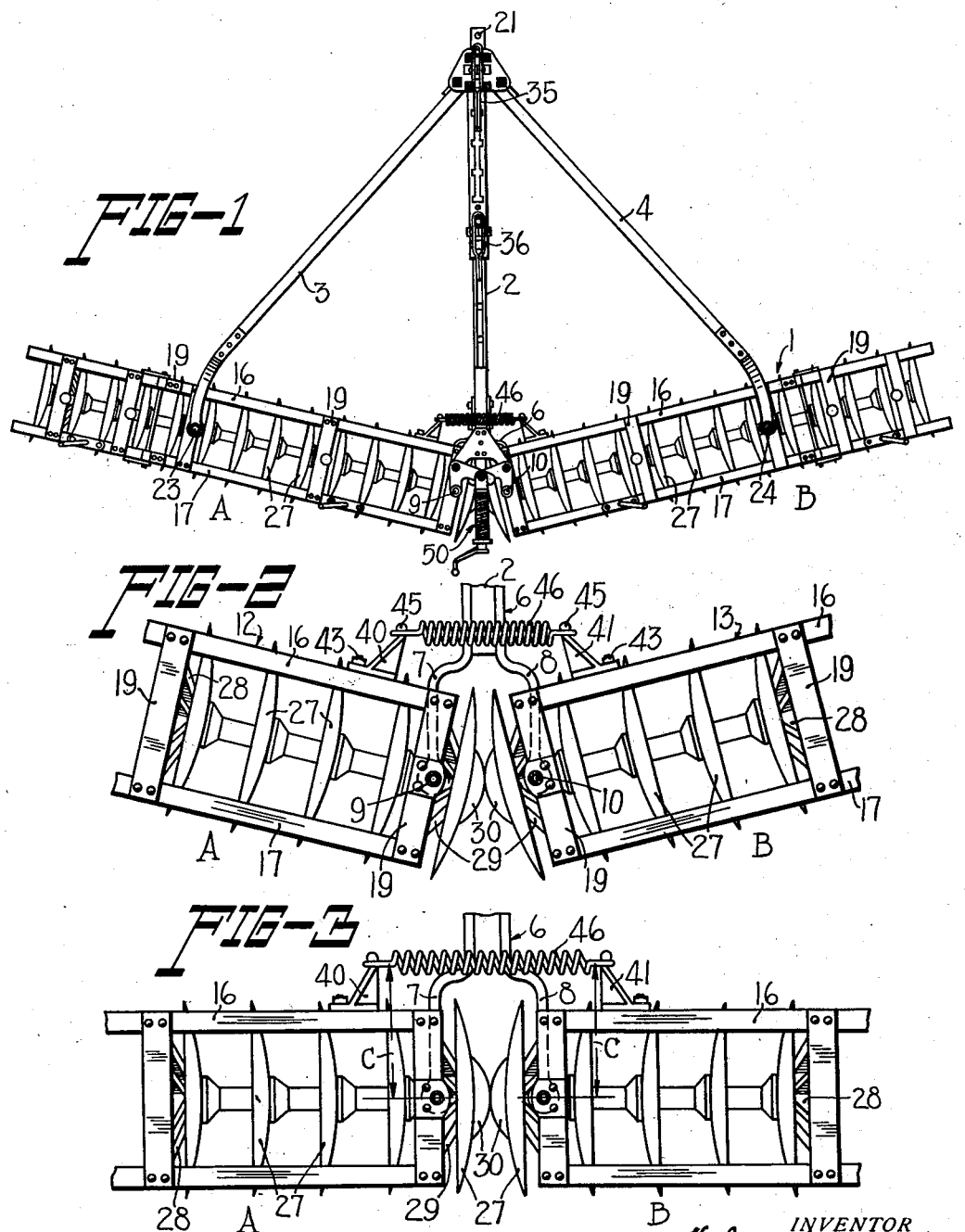

2,062,756

UNITED STATES PATENT OFFICE 2,062,756

DISK HARROW

Herbert B. McKahin, Moline, Ill., assignor to Deere & Company, Moline, Ill., a corporation of Illinois Application December 20, 1934, Serial No. 758,352

14 Claims. (Cl. 55—81)

The present invention relates generally to agricultural implements and is more particularly concerned with a new and improved disk harrow.

The present invention is especially concerned with the provision of a new and improved disk harrow of the type which comprises a pair of disk gangs pivotally connected to a draft frame or the like for swinging movement in a longitudinal plane from a transport position to an angled or working position, and vice versa, and in which the relative position of the gangs is controlled by exerting a thrust force, as by backing the implement, or a pulling force, as by going forwardly, to the inner ends of the gangs or to the outer ends of the gangs, while permitting the opposite ends of the gangs to remain relatively stationary during such operation by virtue of the resistance of the ground imposed upon said opposite ends of the gangs. In disk harrows of this type, especially those having relatively short gangs, difficulty is sometimes encountered in making this adjustment of the harrow from a transport position to a working position because of the natural tendency of the disks to roll on the ground, for, even though the draft or pulling force is applied to one end of the gang only, the opposite end of the gang has the tendency to roll with the end of the gang at which the thrust or pulling force is applied. This is true because usually in implements of this kind the aligned disks are disposed in transverse relation with respect to the line of advance with the planes of the individual disks being parallel with the line of advance. Thus, even though the pulling or pushing force is exerted at one end of each gang, all of the disks tend to roll together when in this position. However, when the implement is in working position with the disks cutting into the soil, there is sufficient resistance offered so that when the pulling or pushing thrust is exerted near one end of the gangs the resistance of the soil is sufficient to swing them around the pivots of the gang frame connections.

With the above factors in mind, the principal object of the present invention is to provide a harrow of this type which is so constructed and arranged that this tendency of the disk gangs to remain in a transport position is counteracted by means which exerts a relatively small but appreciable force tending to swing the gangs from their transport to their working position. Thus, when, as above stated, the disks tend to rotate or roll together, this force, although relatively small, is sufficient to angle the disk gangs slightly, and this angling increases the ground resistance so that the gangs swing under the applied thrust or pull to the position desired. However, it is another object of the present invention to so construct and arrange this biasing means that the movement of the gangs from their working position to a transport position is not affected, although such movement slightly increases the bias of said means.

More specifically, it is an object of the present invention to provide a spring carried by and directly connected with the gangs themselves, and acting at one end against one gang and at the other end reacting against the other gang for exerting the desired tendency to cause both of them to tend to swing to their working position. Preferably, this is accomplished by arranging the spring transversely with respect to the draft member and connecting the ends of the spring to suitable brackets or the like carried by the frames of the disk gangs in a position spaced fore and aft or longitudinally of the pivotal connection between the gangs themselves, so as to continually exert a tendency to urge the gangs to swing from a transport position to a working position. As is obvious, however, such spring must be insufficient to prevent the gangs from returning to a transport position, but such spring means, even though insufficient to exert any appreciable resistance tending to prevent the gangs from swinging back into their transport position, will nevertheless exert a sufficient tendency to swing the gangs to an angled position so as to overcome the natural tendency of the gangs to roll forward or backward together and thus remain in a transport position.

While attempts have been made to employ springs and possibly other means with this same general idea in mind, such means have usually been arranged to act against both of the gangs through suitable levers and the like and to react directly against the draft frame. According to the principles of the present invention one end of the spring means is connected with one section of the disk harrow and the other end of the spring means is connected to the other section of the harrow, thus providing a construction which is at once simple and inexpensive yet sturdy and effective in practice.

These and other objects and advantages of the present invention will be apparent to those skilled in the art after a consideration of the following detailed description of the preferred structural embodiment, taken in conjunction with the accompanying drawing illustrating such preferred embodiment.

In the drawing:

Figure 1 is a top plan view of a single action disk harrow of the tractor propelled type and embodying the principles of the present invention;

Figure 2 is a fragmentary enlarged view showing the disk gangs in their working position; and Figure 3 is a view similar to Figure 2 but showing the disk gangs when in transport position.

The main elements of the harrow, indicated in its entirety by the reference numeral 1, comprise two gangs A and B which are disposed substantially abreast of each other in generally oppositely extending relation with respect to a central or intermediate draft member 2 and two outwardly disposed bars 3 and 4, the whole comprising draft means by which the gangs A and B are propelled.

The disk harrow chosen to illustrate the principles of the present invention is similar in a number of respects to the implement shown in the patent to Charles H. White, No. 1,941,504, issued January 2, 1934, to which reference may be made for the details of the draft means and the gangs. It is sufficient to note here that the rear end of the central draft bar 2 is provided with a yoke 6 having arms 7 and 8 the rear ends of which are pivotally connected, as at 9 and 10, with the gang frames 12 and 13, each of which consists of a plurality of front and rear bars 16 and 17 and suitable cross bars 19. The front end of the draft member 2 is adapted to have draft connection at the point 21 with any suitable source of propelling power, such as a tractor or the like, and the laterally divergent draft bars 3 and 4 are pivotally connected at their rear ends with the outer portions of the two gangs at 23 and 24, and at their front ends the bars 3 and 4 have pivotal connection with the central draft bar 12 in a manner and for the purpose more clearly set forth in the prior patent mentioned above.

The two gangs A and B are substantial duplicates and each includes an operative set of disks 27 arranged in coaxial relation upon a rotatable shaft supported in standards 28 and 29 suitably secured in any desirable manner to the gang frame, and the inner disks 27 are provided with generally spherical bumper plates 30 which, since the disks 27 of the gangs A and B face outwardly in opposite directions, serve to take the laterally inwardly directed reaction of the soil pressure against the disks when the latter are in their operating position, the position shown in Figure 2. As is well understood in the art, however, the disks 27 could be arranged so that they would face inwardly in which, instead of contacting bumper plates or the like other means would be supplied to hold the two gangs in proper relation with respect to each other.

There is suitable means, as more clearly set forth in the aforesaid patent, such as latches 35 and 36, the particular details of which per se do not form any part of the present invention, by which a thrust or a pull may be exerted on either the inner ends or the outer ends of the gangs A and B. For example, considering the harrow as arranged in Figure 1, if the latch 35 is released and a pull is exerted against only the inner ends of the gangs A and B, the resistance of the soil opposing any forward movement of the outer ends of the gangs will cause the latter to straighten into the position shown in Figure 3, with the two sets of disks in alignment. Figure 1 shows the implement in working position, and when the disks are arranged as illustrated in Figure 3, the implement is in a transport position, in which the disks merely roll along the ground but do not work the same. As explained above, after the implement has been arranged, as in Figure 3, in its transport position, if the latches 35 and 36 are arranged to exert a forward pull at points 23 and 24 or a rearward thrust at points 9 and 10, it sometimes occurs that the gangs will not immediately swing back to their working position, as in Figure 1, but the disks 27 will merely roll along the ground, even though the application of the pull or thrust is eccentric with respect to the center of resistance of the gangs. If, for example, the gangs should be slightly angled in order to cause the disks to bite into the soil to some extent, then a forward pull at points 23 and 24 or a rearward thrust at points 9 and 10 would immediately swing the gangs A and B to their working position as shown in Figure 1. In order to supply this initial bias, according to the principles of the present invention I provide a pair of brackets or arms 40 and 41 and mount the same on the front gang frame bars 16 by any suitable manner, such as bolts 43. The brackets or arms 40 and 41 have hook-like ends 45 to receive the opposite ends of the transversely disposed tension spring 46. As will be apparent from Figure 1, the spring 46 is disposed above the draft member 2 and, being connected directly to the gang frames, is disposed in a plane above the plane containing the axes of the two sets of disks 27.

When arranged in this manner the spring 46 has a tendency to swing the gangs A and B at all times from the position shown in Figure 3, the transport position, to the position shown in Figure 1, the working position. As will be apparent from Figure 3, the lever arm at which the force of the tension spring 46 acts is equal to the distance, measured in a particular direction with respect to the axis of the disks 27, from the hook end of the associated spring bracket or arm to the axis of the associated set of disks. This distance is represented for each gang A and B by the reference character c in Figure 3. While I prefer to use brackets 40 and 41 to mount the tension spring 46, such is not essential to the present invention, since the spring 46 could, if desired, be hooked or otherwise secured to openings or clips formed in or carried by the gang frames. Furthermore, a compression spring rather than a tension spring could be used, but in that case the compression spring should be connected to the gang sections A and B at points rearwardly of the points of connection of the sections A and B with the draft member 2.

In disk harrows of the type just described in which the disks are so arranged and the gangs so angled that the soil is thrown outwardly and the reactions thereof taken by the contacting bumper plates 30, there sometimes occurs a tendency for the inner ends of the gangs to rise or buckle upwardly, and it is desirable, as pointed out in the aforesaid patent, to provide a mechanism, such as that indicated in its entirety by the reference numeral 50, to counteract the tendency of the inner ends of the gangs to rise. However, it being remembered that the tension spring 46 is disposed above the axis of the disks 27, the spring 46 also exerts a tendency to counteract the upward thrust at the innermost ends 30, 30 of the harrow. The proportion between the forward disposition of the spring 46 and the amount of its elevation above the horizontal plane containing the axes of the two sets of disk gangs 27 determines the amount of resistance which the tension spring 46 imposes to overcome the upward shifting of the inner ends of the gangs. Ordinarily, for best operation so far as tending to swing the gangs to their operating or working position is concerned, the effect of the spring 46 in aiding the mechanism is hardly appreciable, but it may be made so if desired. If the spring 46 were disposed in the plane which contains the axes of the two sets of disks, there would be no such effect whatsoever.

The same biasing means as that described above could be employed for the same purpose in an in-throw harrow, that is, one in which the disks are arranged to throw the soil inwardly, but in this case if a tension spring were used it would need to be disposed rearwardly of the points of pivotal connection of the gang sections A and B with the draft member 2, or if the spring means took the form of a compression spring, such means should be disposed forwardly of the inner pivots of the gang sections A and B.

While I have shown and described above the preferred form of my invention, it will be apparent to those skilled in the art that the present invention is not to be limited to the particular details shown and described above, but that, in fact, widely different means may be employed in the practice of the broader aspects of my invention.

What I claim, therefore, and desire to secure by Letters Patent is:

1. A disk harrow comprising a pair of disk gangs, means including bumper plates carried, respectively, by said gangs for movably connecting the latter together for movement into and out of operating position, and means spaced generally longitudinally of the harrow from said bumper plates and arranged to act against one gang and to react against the other gang biasing them for movement toward their operating position.

2. A disk harrow comprising a pair of disk gangs movably connected together for movement from an aligned transport position into and out of an angled working position, and means carried wholly by said gangs and spaced from the axis of rotation thereof and tensioned when said gangs are aligned axially for biasing said gangs for movement toward their working position.

3. A disk harrow comprising a pair of disk gangs disposed generally in transverse axial alignment, means connecting said gangs together for pivotal movement about an axis intersecting the axis of rotation of said gangs from an axially aligned position into and out of an angled working position, and means carried wholly by said gangs and spaced from the axis established by said pivotal connecting means for biasing said gangs for movement toward their working position.

4. A disk harrow comprising a pair of disk gangs, each having a frame, said gangs being disposed generally in transverse axial alignment, means connecting said gangs together for pivotal movement from an axially aligned position into and out of an angled working position, and means connected directly to the frames of said gangs at points spaced from the axis established by said pivotal connecting means and acting thereagainst only at said points for biasing said gangs for movement toward their working position.

5. A disk harrow comprising a pair of disk gangs pivotally connected together for movement into and out of an angled working position, and spring means carried by and acting against said disk gangs and operable to urge them toward one another and to move toward their angled working position.

6. A disk harrow comprising a pair of disk gangs pivotally connected together for movement into and out of a working position, a pair of brackets, one carried by each of said disk gangs and spaced from the pivot axis, and spring means carried by said brackets and reacting against them tending to swing said gangs into their working position.

7. A disk harrow comprising a pair of disk gangs, each consisting of a gang frame, means pivotally connecting said frames together at their adjacent ends for swinging into and out of working and transport positions, a bracket mounted on each of said gang frames adjacent the inner end thereof, and transversely disposed spring means connected at its ends with said brackets and serving to bias said gangs for movement toward one position.

8. A disk harrow comprising a pair of disk gangs, each having a gang frame, means pivotally connecting said frames together about generally vertically disposed axes for movement into and out of working and transport positions, means serving as brackets carried by said frames forward of said axes, and resilient means connected with and tensioned between said bracket means tending to swing the inner ends of said frames rearwardly.

9. A disk harrow comprising a draft member, a pair of disk gangs extending laterally at opposite sides from said draft member and reacting against one another at points substantially in line with the axis of rotation of said gangs, and spring means connected at one end with one of said gangs and at the other end with the other of said gangs at points disposed in a fore and aft direction from the point of reaction between said gangs for biasing them for swinging movement about their axes relative to said draft member.

10. In a disk harrow, a draft member, a pair of disk supporting gang frames pivoted at their inner ends to said draft member for relative angular movement in a horizontal plane, means carried by said draft member for swinging said gang frames relative to each other to shift them from a transport position to a working position, and spring means connected at opposite ends directly to said gang frames and spaced in a fore and aft direction from the points of pivotal connection between said gang frames for yieldingly urging the latter to swing from a transport position to a working position.

11. In a disk harrow, a central draft member, a pair of disk supporting gang frames separately pivoted at their inner ends to said draft member for relative angular movement in a horizontal plane, means carried on said draft member for swinging the outer ends of said gang frames relative to the inner ends to shift said gang frames from a transport position to a working position, an arm extending forwardly from the inner end of each gang frame, and a tension spring connected at opposite ends to said arms to yieldingly urge said gang frames to swing from a transport position to a working position.

12. In a disk harrow, a central draft member, a pair of disk supporting gang frames separately pivoted at their inner ends to said draft member for relative angular movement in a horizontal plane, means for swinging said gang frames relative to said draft member to shift said gang frames from a transport position to a working position, and a tension spring connected at its opposite end to the inner ends of said gang frames, respectively, at points spaced forwardly of the transverse plane passing through the points of pivotal connection of said gang frames with said draft member and acting to yieldingly urge said gang frames to swing from a transport position to a working position.

13. In a disk harrow, a draft member, a pair of gang frames pivotally connected with said draft member for relative angular movement in a horizontal plane, a plurality of axially aligned disks carried by each of said frames, the axis of said aligned disks of each gang frame being disposed below the general plane of the frame, means carried by said draft member for swinging said gang frames to shift the latter from a transport position to a working position, and spring means connected between the inner ends of said gang frames above said draft member and above and forward of the axes of said aligned disks and reacting against said frames to yieldingly urge the same to swing from a transport position to a working position.

14. In a disk harrow, a central longitudinally extending draft member, a pair of disk gang frames pivotally connected at their inner ends to said draft member, a slide on said draft member, a pair of draft links connected to said slide and to said gang frames, respectively, near the outer ends thereof, operator controlled means for locking and unlocking said slide to said draft member, and means directly connected between the inner ends of said gang frames and reacting thereupon at points spaced longitudinally from the transverse plane passing through the points of pivotal connection of said frames with said draft member and acting to yieldingly urge said gang frames to swing from a transport position to a working position whenever said slide is unlocked and force is applied to said draft member.

HERBERT B. McKAHIN.